(12) United States Patent
Lee

(10) Patent No.: US 7,731,151 B2
(45) Date of Patent: Jun. 8, 2010

(54) PENDULUM VACUUM GATE VALVE

(76) Inventor: Kenneth K L Lee, 5723 Halleck Dr., San Jose, CA (US) 95123

( * ) Notice: Subject to any disclaimer, the term of this patent is extended or adjusted under 35 U.S.C. 154(b) by 288 days.

(21) Appl. No.: 11/904,485

(22) Filed: Sep. 27, 2007

(65) Prior Publication Data

US 2009/0084997 A1    Apr. 2, 2009

(51) Int. Cl.
*F16K 31/126* (2006.01)

(52) U.S. Cl. .................. 251/61; 251/175; 251/195; 251/302; 251/335.2

(58) Field of Classification Search ............ 251/195, 251/193, 302, 301, 335.2, 175, 61
See application file for complete search history.

(56) References Cited

U.S. PATENT DOCUMENTS

| | | | | |
|---|---|---|---|---|
| 2,476,711 A | * | 7/1949 | Edwards | 251/175 |
| 2,705,610 A | * | 4/1955 | Hjulian | 251/175 |
| 2,825,528 A | * | 3/1958 | Truitt | 251/175 |
| 4,157,169 A | * | 6/1979 | Norman | 251/195 |
| 4,343,455 A | * | 8/1982 | Winkler | 251/175 |
| 4,381,100 A | * | 4/1983 | Schoenberg | 251/302 |
| 5,087,017 A | * | 2/1992 | Sawa et al. | 251/175 |
| 5,116,022 A | * | 5/1992 | Genreith et al. | 251/175 |
| 6,079,693 A | * | 6/2000 | Ettinger et al. | 251/195 |
| 6,561,484 B2 | * | 5/2003 | Nakagawa et al. | 251/175 |

\* cited by examiner

*Primary Examiner*—John Bastianelli
(74) *Attorney, Agent, or Firm*—Brian Beverly; Louis L. Wu; Beeson Skinner Beverly

(57) ABSTRACT

A pendulum vacuum gate valve comprised of a housing for enclosing a valve plate assembly having a pair of air pressure actuated floating seal plates disposed on opposite sides of the valve plate assembly which is actuated by a gate arm to reciprocate between open and closed positions and intermediate stop positions for controlling gas flow between intake and exhaust conduits connected to the housing.

8 Claims, 4 Drawing Sheets

PENDULUM VACUUM GATE VALVE

BACKGROUND OF THE INVENTION

1. Field of the Invention

The present invention relates to a gate valve for gas flow control in vacuum systems.

More particularly it relates to a pendulum vacuum gate valve having a first axis of motion for moving the valve plate assembly into and out of a gas flow conduit for large scale flow control throttling and a second axis of motion for fine scale flow control throttling and sealing the valve plate assembly in the passageway.

Specifically the present invention relates to a motor driven pendulum gate valve for vacuum systems which is actuated in a first axis of rotational motion of the valve assembly transverse to the gas flow to control relatively large scale volume gas flow in the system. The valve assembly is actuated in a second axis of motion longitudinal to the gas flow by air pressure to throttle comparatively fine scale volume gas flow and to alternatively seal both sides of the valve plate assembly from within the housing whereby both actuating mechanisms are sealed and separated from the vacuum chamber environment.

2. Description of the Prior Art

The use of gate valves in one form or another for the purpose of controlling gas flow in vacuum systems and lines is known in the prior art. However, despite the numerous designs, structures, forms, and variety of apparatus disclosed by and utilized in the prior art, and which have been developed for the accomplishment of the specific objectives, purposes, and requirements of gas flow control in vacuum environments, the devices, machines, and constructions which have been hereto-fore devised and utilized to accomplish these goals consist basically of familiar, expected, and obvious configurations, combinations, and arrangements, of well known structural forms and apparatus. This will become apparent from the following consideration of the the closest known and relevant prior art.

In thin film processing, as the size of the silicon wafer increases and the geometry of the device decreases, there is an ever greater need for uniform pressure and flow control in a wafer process chamber. Pendulum valves are often used to control flow/pressure in vacuum chambers and are typically located between a chamber and the vacuum pump. In these pendulum valves, the valve plate can typically move from a fully open to a fully closed position. This generally involves rotating a valve plate assembly transversely from an open position in the gas flow channel to an interposed condition and then moving the seal plates vertically, or longitudinally within the channel, to the closed position to seal the valve.

Prior art pendulum valves typically use a rotating shaft to swing the valve plate assembly between open and closed positions. Usually a secondary mechanism which uses air cylinders, cams, or linkage converts horizontal motion into vertical movement of the valve plate assembly to make a tight seal. These prior art mechanisms are complex and relatively dirty for use in vacuum chamber conditions and create maintenance problems. The actuation mechanisms are usually exposed to the gas flow inside the valve housing and are a common source for contaminant origination in a vacuum environment. Wear and rubbing of the operative parts of the valve generate the contaminants to the vacuum environment reducing yield and causing prolonged maintenance downtime.

In situations where valves operate under heated conditions, the reliability of mechanical linkages is further reduced. The pendulum vacuum gate valve contemplated according to the present invention has no linkages, no rubbing or wearing surfaces, and this allows high-temperature bake with no adverse effects. The present invention departs substantially from the conventional concepts and designs used by the prior art, and in doing so, provides an apparatus primarily developed for the purpose of overcoming the problems as described above. However, it accomplishes the result in a different manner with an optimally designed apparatus for producing an improved pendulum vacuum gate valve which is more effective, cleaner, more reliable, and bakeable (can be subjected to high temperature heating).

SUMMARY OF THE INVENTION

In view of the foregoing known, obvious, and described disadvantages inherent in the known types of vacuum gate valves presently existing in the prior art, the present invention provides a new apparatus and construction for a pendulum vacuum gate valve wherein the same can be utilized to more effectively throttle and seal a system conduit without introducing contaminants to the vacuum environment.

The general purpose construction of the present invention, which will be described hereafter in greater detail, has been designed to provide a new and improved pendulum vacuum gate valve which has many of the advantages of the prior art of gate valves mentioned and described above. It is comprised of many novel features and improvements in design and performs the functions that result in a new vacuum gate valve which is not anticipated, rendered obvious, suggested, or even implied by any of the prior art of vacuum valves heretofore known, either alone or in any combination thereof.

The present invention is a pendulum vacuum valve assembly. It is comprised of a housing for enclosing a valve plate assembly. The housing has a pair of aligned openings disposed on opposite sides of the housing for attachment of intake and exhaust conduits thereto. The housing is formed to permit a valve plate assembly to be reciprocated from an open position, out of alignment with the opposed openings, through an infinite number of intermediate stop positions, to a closed position between the aligned openings, not in contact therewith. In other words, the housing is formed to permit the valve plate assembly to be moved laterally or cross flow within the housing between the intake and exhaust conduits to provide an infinite number of variable stop positions for the valve plate assembly, which are out of aligned interposition between the openings, as well as a closed position between the conduit openings (which does not completely seal the valve) as a primary throttle control for relatively large-scale gas flow between the intake and exhaust conduits.

The valve plate assembly is attached to an actuating gate arm and disposed internally of the housing and formed to reciprocate the valve plate assembly between the open and closed positions and an infinite number of intermediate stop positions, gas flow throttling positions, there between.

A pair of floating seal plates are disposed on opposite sides of the valve plate assembly and constrained within the circumference thereof by flanges projecting from opposite sides of the valve plate assembly proximate to the circumferences of the seal plates and restraining them therein. The seal plates are formed to mate and seal with the interior surfaces of the aligned openings of the housing when the valve plate assembly is aligned therewith in the closed position and actuated to move the seal plates outward longitudinally to the seal position which seals the valve.

A pair of air actuated diaphragms are secured to opposite sides of the valve plate assembly and formed to expand the seal plates outward from the valve plate assembly into contact with the interior surfaces of the aligned openings to seal the valve when the valve plate assembly is aligned with the openings. The diaphragms can be actuated to expand the seal plates to an infinite number of intermediate positions short of contact with the openings or the seal position to provide a secondary throttle control for fine tuning the gas flow between the intake and exhaust conduits.

A motor powered drive assembly is secured to the actuating gate arm to reciprocate it through a portion of an arc to move the valve plate assembly within the housing between the open and the closed positions and to variable throttling positions there between and the seal position.

A means is provided for expanding and contracting the diaphragms into and out of contact with the respectively adjacent seal plates.

The more important features of the invention have been broadly outlined in the preceeding summary of the invention in order that the detailed description thereof which follows may be better understood and in order that the present contribution to an improvement in the art may be better appreciated. There are additional features of the invention that will be described hereinafter and which will form the subject matter of the claims appended hereto.

With respect to the claims hereof, and before describing at least one preferred embodiment of the invention in detail, it is to be understood that the invention is not to be limited in its application to the details of construction and to the arrangements of the components which are set forth in the following description or illustrated in the accompanying drawings. The invention is capable of being created in other embodiments and of being practiced and carried out in various ways. Also, it is to be understood that the phraseology and terminology employed here are for the purpose of description and should not be regarded as limiting.

As such, those skilled in the art in which the invention is based will appreciate that the conception upon which this disclosure is predicated may readily be utilized as a basis for the designing of other forms, structures, apparatus, systems, and methods for carrying out the several purposes of the present invention. It is important, therefore, that the claims be regarded as including such equivalent constructions in so far as they do not depart from the spirit and scope of the present invention.

Further, the purpose of the appended abstract is to enable the United States Patent and Trademark Office, and the public generally, and especially scientists, engineers, and practitioners of the art who are not familiar with the patent and legal terms or phraseology, to determine quickly from cursory inspection the nature and essence of the technical disclosure of the application. The abstract is neither intended to define the invention of the specification, which is measured by the claims, nor is it intended to be limiting as to the scope of the invention in any way.

OBJECTS OF THE INVENTION

It is therefore an important object of the present invention to provide an improved pendulum vacuum gate valve which is cleaner, more reliable, and bakeable.

It is another object of the present invention to provide a pendulum vacuum gate valve which can be actuated by a motor between open and closed positions as well as an infinite number of intermediate gas flow throttling positions providing a first (large) scale of gas flow control.

It is a further object of the present invention to provide a pendulum vacuum gate valve which can be actuated by air pressure between closed and seal positions as well as an infinite number of intermediate gas flow throttling positions providing a second (fine) scale of gas flow control.

It is a yet another object of the present invention to provide a pendulum vacuum gate valve which can be actuated by an air pressure controlled diaphragm to effectively seal the gas flow conduit in which the valve is interposed.

It is still a further object of the present invention to provide a pendulum vacuum gate valve which has no linear or rotational operating mechanisms in the vacuum environment which substantially reduces contamination sources.

And it is yet still another object of the present invention to provide a pendulum vacuum gate valve which is self aligning and eliminates the need of any field adjustment.

Other objects and advantages of the present invention will become apparent when the method and apparatus of the present invention are considered in conjunction with the accompanying drawings.

DESCRIPTION OF THE DRAWINGS

The invention is illustrated in the accompanying drawings but not limited by reference to the particular embodiments shown therein of which.

DESCRIPTION OF THE PREFERRED EMBODIMENT

Reference is made to the drawings for a description of the preferred embodiment of the present invention wherein like reference numbers represent like elements on corresponding views.

Figure 1:
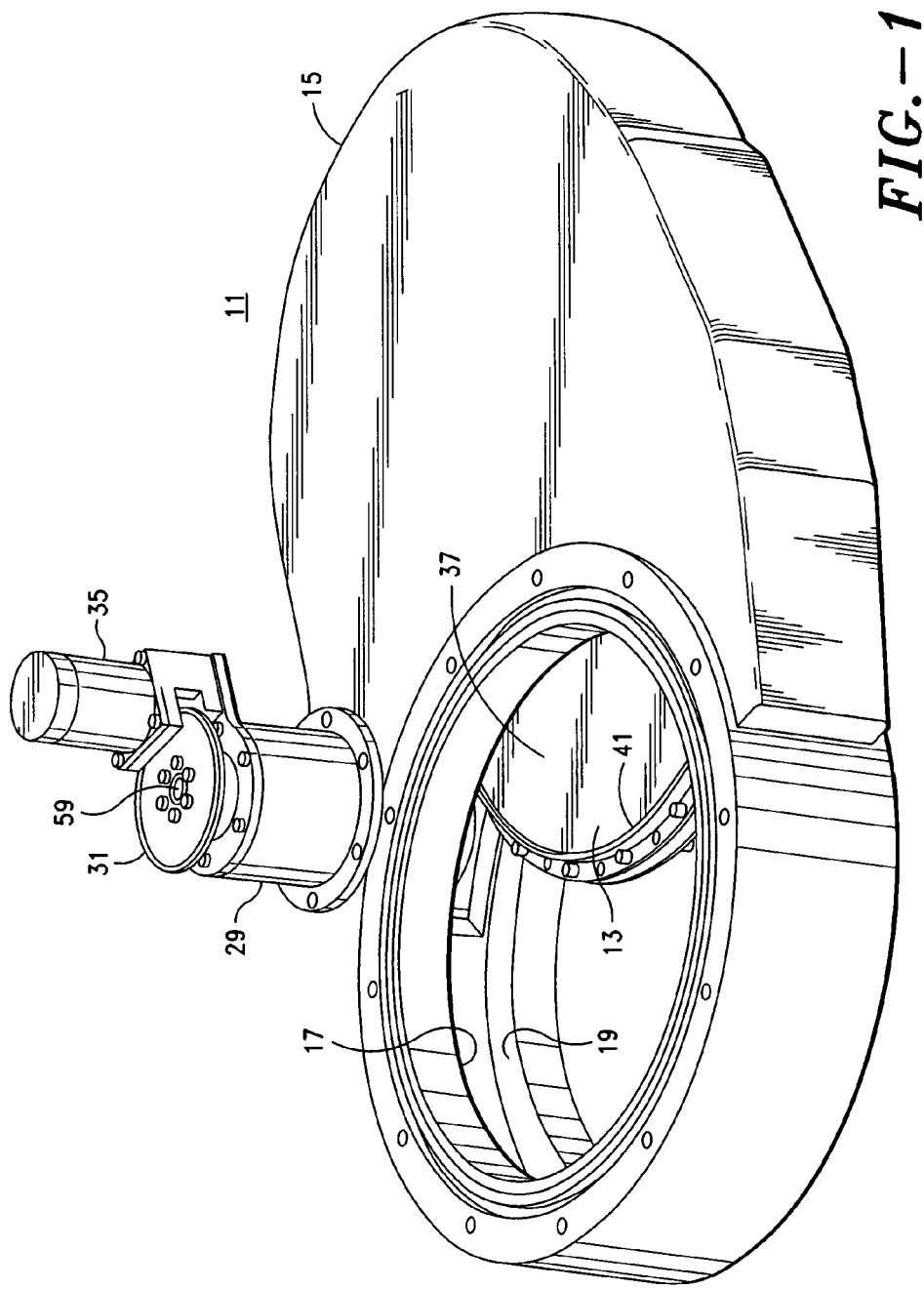
FIG. 1 is a perspective view of the assembly of the present invention.
Figure 2:
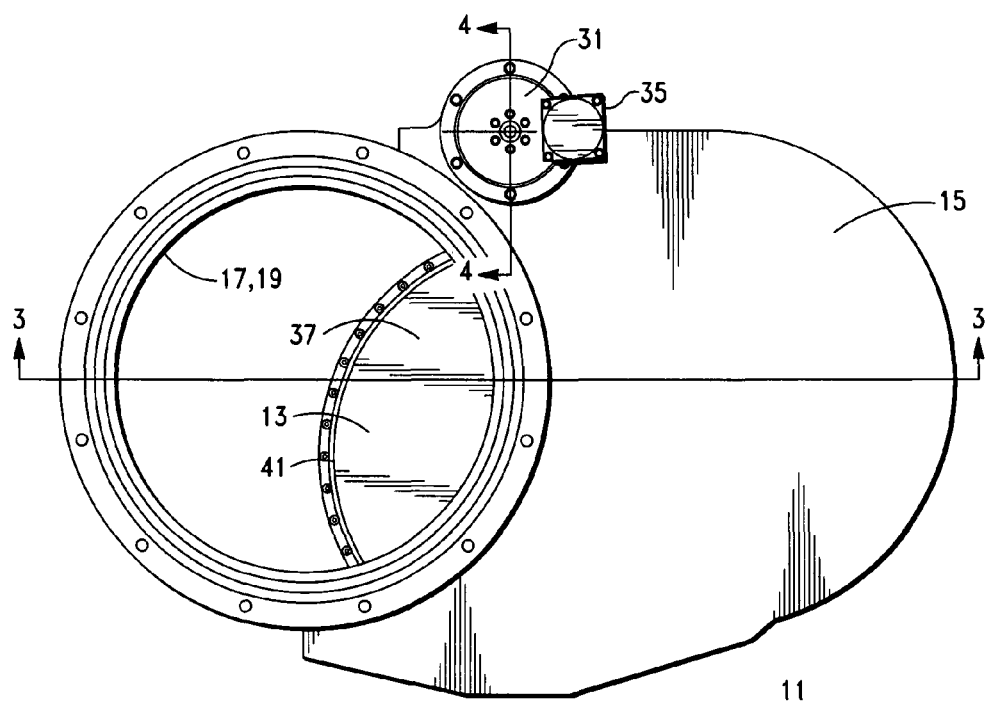
FIG. 2 is a top plan view thereof in the partially open position.

FIG. 1 is a perspective view of the pendulum vacuum gate valve 11 of the present invention shown with the valve plate assembly 13 partially open or in a large-scale throttling position.

Reference is made to FIGS. 1-3 & 5. The pendulum vacuum gate valve 11 of the present invention is comprised in part of a housing 15 formed for enclosing the valve plate assembly which can be reciprocated on two axes which, when actuated to control the gas flow through the valve, provides two scales of throttle control.

The housing 15 has a pair of aligned openings 17, 19 disposed on opposite sides of the housing for the attachment of intake and exhaust conduits thereto. The intake conduit is in gas flow communication with the vacuum environment. The housing is formed to permit the valve plate assembly 13 to be reciprocated latterally in the housing (transverse to the gas flow) on a first axis for a first scale of gas flow control.

The valve plate assembly 13 can be moved from an open position in the housing 15, out of alignment with the opposed conduit openings 17, 19, through an infinite number of intermediate stop positions, to a closed position between the aligned openings for the intake and exhaust conduits which are attached to the housing where the valve is interposed into the vacuum system. An infinite number of intermediate stop positions means that the valve plate assembly can be stopped at any position between its limits of motion.

Reciprocating lateral movement of the valve plate assembly 13 between the open and closed positions functions as a primary throttle control for large-scale gas flow control between the intake and exhaust conduits. It provides a first scale coarse gas flow control for the gas flow functions for the vacuum system. The second scale of gas flow control is to be described infra for fine tuning the same gas flow.

Figure 4:
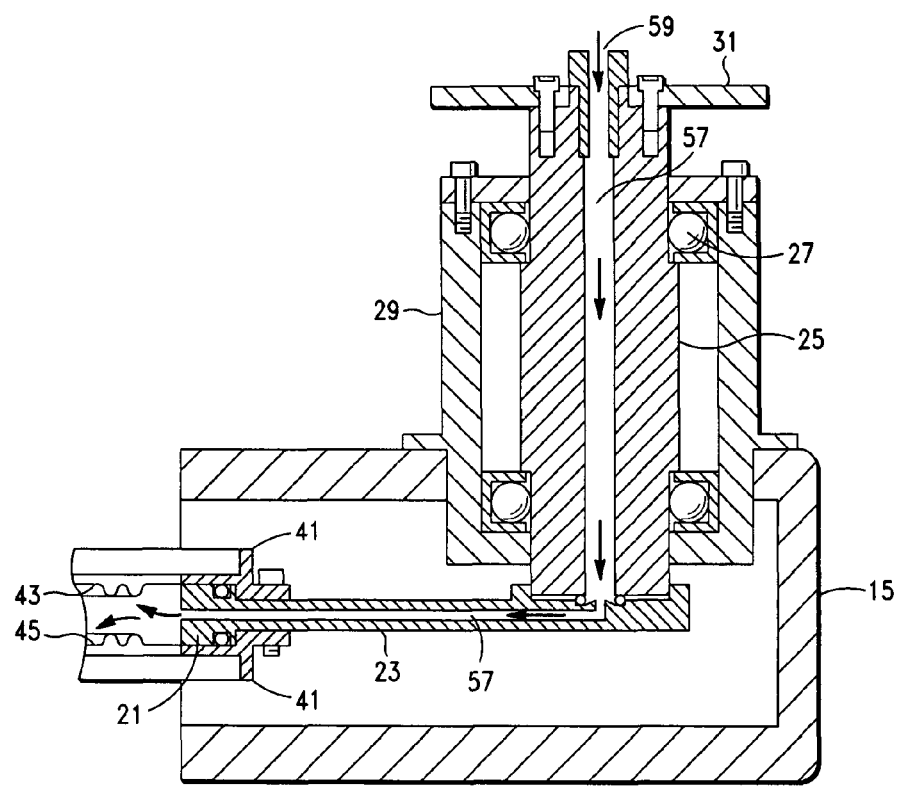
FIG. 4 is a cross section view of the drive assembly.
Figure 6:
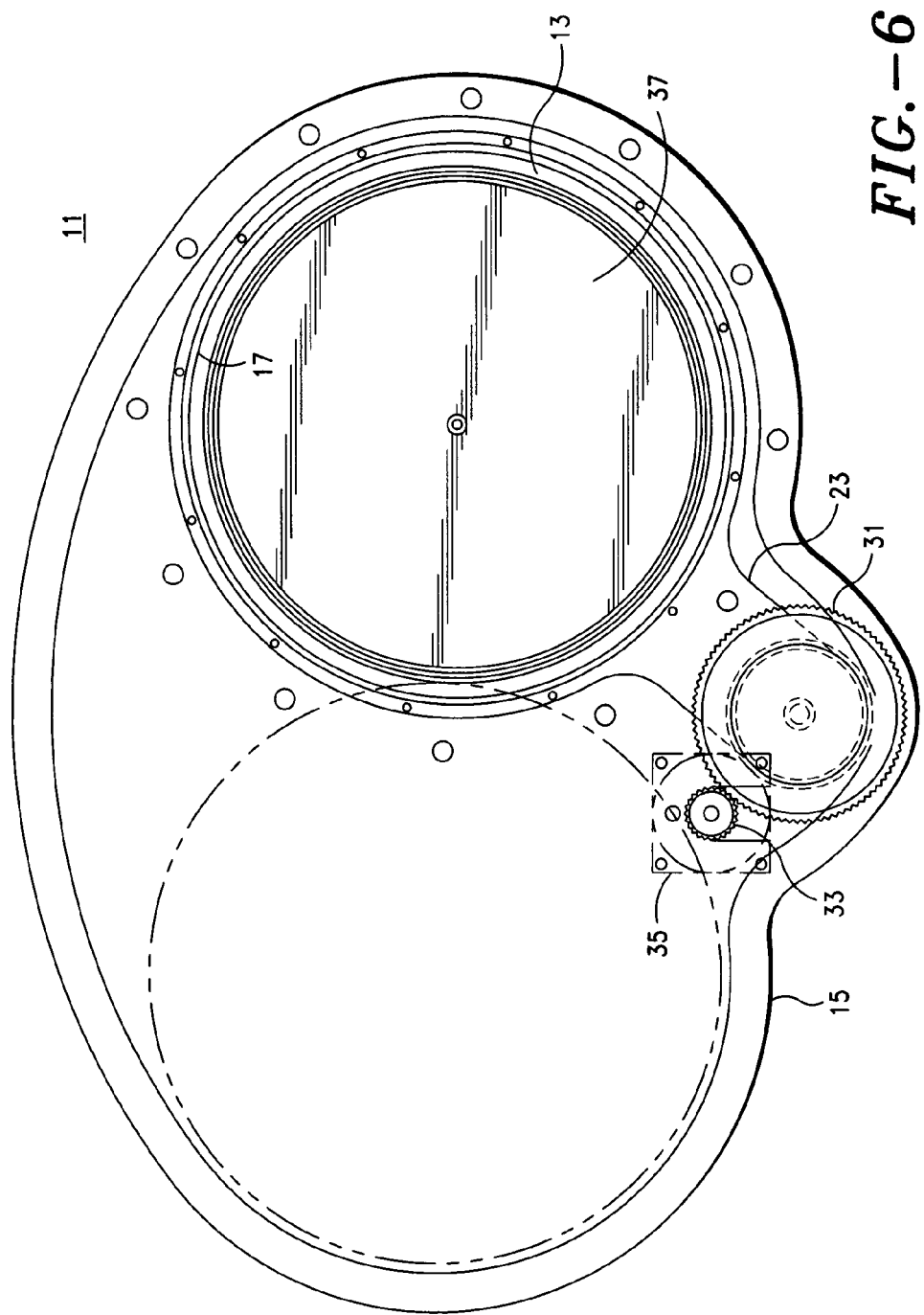
FIG. 6 is a top plan view of of the invention of FIG. 1 with the top cover removed and showing the drive assembly.

Reference is made to FIGS. 1, 4, & 6. The valve plate assembly 13 includes a first ring member 21 attached to an actuating gate arm 23; preferably by in part being formed integral thereto. The first ring member and gate arm are both disposed internally of the housing 15 and formed to reciprocate together between a closed position, disposed between the aligned openings 17, 19, and an open position which is any stop position out of alignment with said openings or an infinite number of intermediate stops or throttling positions there between.

The gate arm 23 is secured to the lower end of a rotatable driveshaft 25 which in the preferred embodiment of the invention is supported in a pair of ball bearing races 27 in a removable tower 29. A drive gear 31 is secured to the top end of the driveshaft which in turn is meshed with a spur gear 33 driven by an electric motor 35 secured to the top of the removable tower. Actuation of the electric motor selectively rotates the driveshaft and gate arm to move the valve plate assembly 13 laterally, transverse to gas flow, between the open and closed positions and any stop positions there between for and infinite number of intermediate stops.

Figure 3:
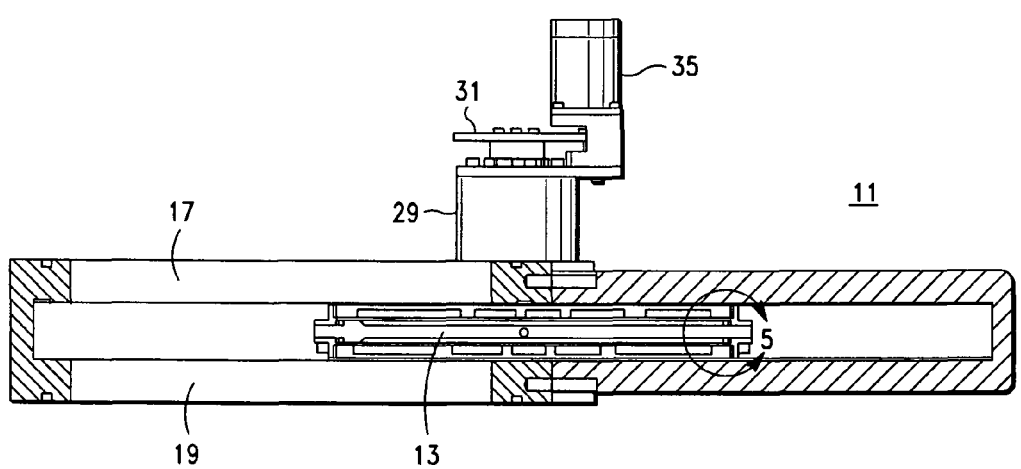
FIG. 3 is a side elevation in section.
Figure 5:
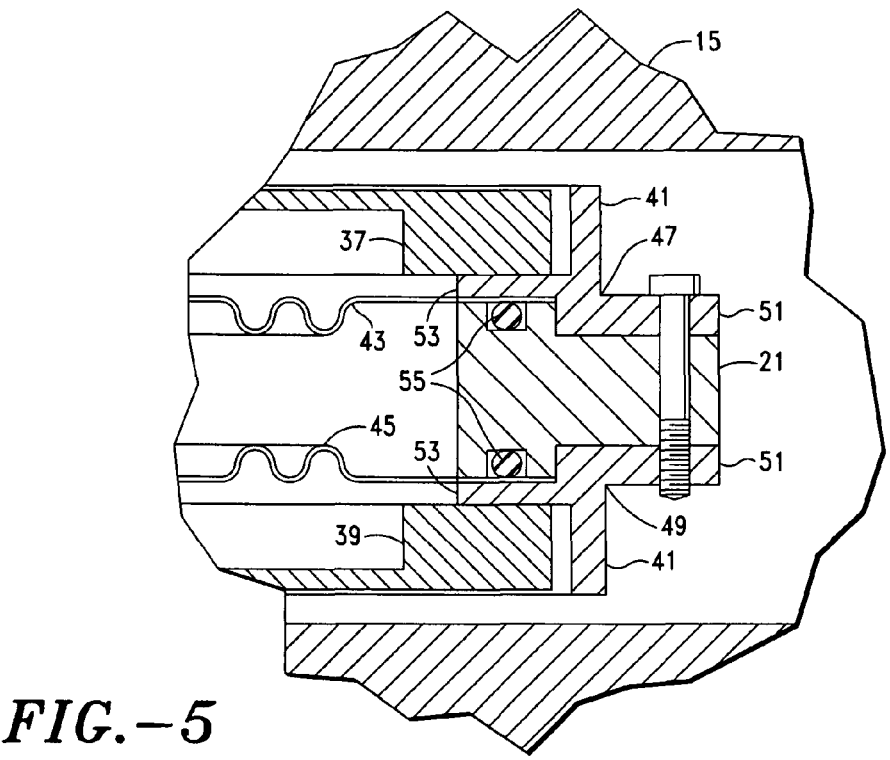
FIG. 5 is a is a broken out cross-section of the end of the valve plate with actuating diaphragm and surrounding housing.

Reference is made to FIGS. 3, 4, & 5. A pair of floating seal plates 37, 39 are disposed on opposite sides of the valve plate assembly 13 and constrained within the circumference of the assembly by flanges 41 projecting from opposite sides of the first ring member 21 at positions proximate to the circumferences of the seal plates and which restrain lateral movement of the seal plates therein. The seal plates are formed to mate and seal with the opposed interior surfaces of the aligned openings 17, 19 of the housing 15 when the valve plate assembly is aligned therewith in the closed position. It will be described infra how the seal plates can be moved outward and apart, longitudinally to the gas flow, from the "closed position" to the "seal position", closing the aligned openings, to seal the valve.

A pair of air actuated diaphragms 43, 45 are secured and sealed to opposite sides of the first ring member 21 by being trapped between the seal plates 37, 39 and the ring member. The diaphragms are formed to expand the seal plates apart or outward (longitudinal to the gas flow) from the valve plate assembly 13 "closed position" through an infinite number of stop (throttling) positions as well as into contact with the interior surfaces of the aligned housing openings 17, 19 which is the "seal position" which completely closes the valve. The valve plate assembly is in the closed position when the seal plates are aligned with the intake and exhaust openings but are out of contact therewith. In the preferred embodiment of the invention, the centers of the diaphragms are pinned to the seal plates such as by rivets or other fasteners.

In the preferred embodiment of the invention, the projecting flanges 41 of the valve plate assembly 13 are formed on the first ring member 21 which is comprised of three elements: a ring member secured to the gate arm 33 and a pair of independent identical multiple flange second ring members 47, 49 clamped to opposite sides of the periphery of the gate arm ring member 21 concentric and integral thereto. The second ring members each form three flanges: the first one 41 projects latterly outward (longitudinal to the gas flow) from the periphery of the gate arm first ring member for constraining the seal plates 37, 39 within the flanges on opposite sides thereof. The second flange 51 of each second ring member projects radially outward to permit securement means such as bolts to penetrate there through around periphery of the first ring member to secure the second ring members to the gate arm ring member forming the first ring member assembly. The third flange 53 projects radially inward to hold the peripherys of the pair of diaphragms 43, 45 against the planar surfaces of the gate arm (first) ring member on opposite sides thereof when the peripheral securement bolts are engaged.

Thus, the second ring members 47, 49 both perform three identical functions: hold the seal plates 37, 39 in position on the first ring member 21; trap the peripheries of the diaphragms 43, 45 on opposite sides of the gate arm first ring member; and provide securement surfaces to permit the second ring members to be secured to the first ring member. O ring seals 55 disposed between the diaphragms and the first ring member prevent atmospheric leaks.

Reference is made to FIGS. 1, 4, & 6. As partially described earlier, a reversing motor 35 powered drive assembly is secured to the exterior of the housing 15, and the output shaft 25 thereof extends through the housing and engages the actuating gate arm 23 to reciprocate it through a portion of an arc and thereby to move the valve plate assembly 13 between open and closed limits of movement. The motor is positioned in atmospheric conditions and sealed from the vacuum chamber. The motor drives a spur gear 33 which is meshed with a drive gear 31 secured to the gate arm driveshaft 25.

A means is provided for expanding and contracting the diaphragms 43, 45 into and out of contact with the respective adjacent seal plates 37, 39. The means includes an air pressure communication channel 57 extending from an inlet 59 at the top of the gate arm drive shaft 25, through the driveshaft and the actuating gate arm 23, and communicates with the circular space internally of the gate arm first ring member 21. Changes in air pressure induced into the air communication channel expand or collapse the diaphragms and actuate the seal plates to expand (when pushed by the diaphragms), or contract when air pressure is released, thereby allowing the seal plates to infinitely change position (over a short distance) longitudinally in the housing for fine tune throttling of gas flow or to seal it off.

The present invention as disclosed herein results in a significantly reduced complexity of pendulum valve. Further, the device of the present construction is easy to maintain and service because the motor is external to the valve. The valve requires no adjustment; it has no wearing elements; and it is a field replaceable module.

The gate valve of the present invention eliminates the problems with valve plate deflection because the diaphragms accommodate to any such variation in valve plate orientation and are self aligning on the valve port surfaces. Both actuating systems for throttling gas flow are sealed and separated from the vacuum environment.

The gate valve of the present invention is lightweight and easy to control having two independent scales of throttling control that are actuated independently by separate drive mechanisms along two different axes of motion. The embodiment of the gate valve of the present invention is comparatively very thin whereby the valve housing is likewise relatively thin for compact installation.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

I claim:

1. A pendulum vacuum gate valve comprising
a housing for enclosing a valve plate assembly, said housing having a pair of aligned openings disposed on opposite sides of said housing for attachment of intake and exhaust conduits thereto, said housing being formed to permit said valve plate assembly to be reciprocated from an open position, out of alignment with said opposed openings, through an infinite number of intermediate stop positions, to a closed position between said aligned openings not in contact there with,
said valve plate assembly attached to an actuating gate arm disposed internally of said housing and formed to reciprocate said valve plate assembly between said open and closed positions and said intermediate stop positions as a primary throttle control for controlling relatively large scale gas flow between said intake and exhaust conduits,
a pair of floating seal plates disposed on opposite sides of said valve plate assembly and constrained within the circumference thereof by flanges projecting from opposite sides of said valve plate assembly proximate to the circumferences of said seal plates and restraining said seal plates therein, said seal plates formed to mate and seal with the interior surfaces of said aligned openings of said housing when said valve plate assembly is aligned therewith in said closed position and actuated to move said seal plates outward longitudinally along a longitudinal axis to the seal position which seals said valve,
a pair of air actuated diaphragms disposed generally parallel to the seal plates and trapped between the seal plates and valve plate assembly, traversing the longitudinal axis and secured to opposite sides of said valve plate assembly and formed to move said seal plates outward from said valve plate assembly into contact with the interior surfaces of said aligned openings to seal said valve when said valve plate assembly is aligned with said openings and said diaphragms are fully actuated to the seal position or to an infinite number of intermediate positions short of said seal positions to provide a secondary throttle control for fine tuning the gas flow between said intake and exhaust conduits,
a motor powered drive assembly secured to said actuating gate arm to reciprocate it through a portion of an arc to move said valve plate assembly within said housing between said open and said closed positions and to variable throttling positions there between, and
means for expanding and contracting said diaphragms to move said adjacent seal plates respectively.

2. The pendulum gate valve of claim 1 wherein said valve plate assembly is formed of a first ring member having said actuating arm secured thereto, said pair of diaphragms being sealed to opposite sides of said first ring member, said ring member having flanges projecting outward from the periphery thereof on opposite sides thereof for retaining said seal plates within said flanges respectively.

3. The pendulum gate valve of claim 2 wherein said valve plate assembly includes a pair of second ring members formed for deposition on opposite sides of said first ring member concentric thereto and forming said flanges, said second ring members formed to encircle said diaphragms on opposite sides of said first ring member between said second ring members.

4. The pendulum gate valve of claim 2 wherein the motor powered drive assembly is secured to the exterior of said housing and extends through said housing.

5. The pendulum valve of claim 2 including an air pressure communication channel extending from an inlet on said motor powered drive assembly through said assembly and said actuating arm and communicating with the space formed internally of said first ring member whereby changes in air pressure induced into said air communication channel expand or collapse said diaphragms actuating said seal plates to expand or contract and thereby allowing said seal plates to infinitely change position in said housing between said closed and said seal positions for fine tune throttling the gas flow or to seal it off.

6. A pendulum vacuum gate valve comprising
a housing for enclosing a valve plate assembly, said housing having a pair of aligned openings disposed on opposite sides of said housing for attachment of intake and exhaust conduits thereto, said housing formed to permit said valve plate assembly to be reciprocated from an open position, out of alignment with said opposed openings, to a closed position between said aligned openings, not in contact therewith,
said valve plate assembly having a first ring member secured to an actuating gate arm disposed internally of said housing, said gate arm formed to reciprocate said valve plate assembly between said open and closed positions and an infinite number of throttling positions there between as a primary throttle control for gas flow between said intake and exhaust conduits,
a pair of second ring members disposed on opposite sides of said first ring member concentric thereto and forming flanges projecting outward from the periphery of said first ring member for constraining seal plates within said flanges respectively,
a pair of floating seal plates disposed on opposite sides of said valve plate first ring member within the peripheries of said second ring members and formed to mate and seal with the interior surfaces of said aligned openings when actuated to a seal position when said valve plate assembly is aligned therewith in said closed position,
a pair of air actuated diaphragms disposed generally parallel to the seal plates and trapped between the seal plates and valve plate assembly, traversing a longitudinal axis and sealed to opposite sides of said first ring member of said valve plate assembly between said first and second ring members and formed to move said seal plates along the longitudinal axis outward from said valve plate assembly between said closed position through an infinite number of throttling positions to said seal position to provide a secondary throttle control for fine tuning gas flow between said intake and exhaust conduits and to seal said valve when said valve plate assembly is aligned with said openings and said diaphragms are fully actuated to said seal position,
a motor powered drive assembly secured to the exterior of said housing and extending there through and engaging said actuating gate arm to reciprocate it through a portion of an arc to move said valve plate assembly between said open and said closed positions of movement, and
means for expanding and contracting said diaphragms to move said respective adjacent seal plates, said means including an air pressure communication channel extending from an inlet on said motor driven rotor assembly through said assembly and said actuating arm and communicating with the space formed internally of said first ring member between said diaphragms whereby changes in air pressure induced into said air communication channel expand or collapse said diaphragms actuating said seal plates to expand or contract and thereby allowing said seal plates to change position in said housing to infinitely open or close said valve for throttling gas flow or seal it off.

7. The valve of claim 1 comprising means for moving the seal plate along the longitudinal axis that consists essentially of the air actuated diaphragms and means for changing air pressure acting on the diaphragms.

8. The valve of claim 6 comprising means for moving the seal plate along the longitudinal axis that consists essentially of the air actuated diaphragms and means for changing air pressure acting on the diaphragms.

* * * * *

UNITED STATES PATENT AND TRADEMARK OFFICE
CERTIFICATE OF CORRECTION

PATENT NO.        : 7,731,151 B2
APPLICATION NO.   : 11/904485
DATED             : June 8, 2010
INVENTOR(S)       : Kenneth KL Lee Page 1 of 1

It is certified that error appears in the above-identified patent and that said Letters Patent is hereby corrected as shown below:

In col. 1, line 63, "generate the contaminants" should read --generate contaminants--.
In col. 4, line 31, "is a" should be deleted between "is a" and "broken out.".
In col. 5, line 29, "for and infinite" should read --for an infinite--.
In col. 5, line 67, "latterly" should read --laterally--.
In col. 6, line 9, "peripherys" should read --peripheries--.

Signed and Sealed this

Ninth Day of November, 2010

David J. Kappos
*Director of the United States Patent and Trademark Office*